(12) United States Patent
Zhang et al.

(10) Patent No.: US 11,989,283 B2
(45) Date of Patent: May 21, 2024

(54) CONTAINER ESCAPE DETECTION METHOD, APPARATUS, AND SYSTEM, AND STORAGE MEDIUM

(71) Applicant: Huawei Cloud Computing Technologies Co., Ltd., Guizhou (CN)

(72) Inventors: Yu Zhang, Beijing (CN); Dahu Kuang, Shenzhen (CN); Yue Yu, Beijing (CN); Yu Chen, Nanjing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 619 days.

(21) Appl. No.: 17/021,428

(22) Filed: Sep. 15, 2020

(65) Prior Publication Data
US 2020/0410089 A1    Dec. 31, 2020

Related U.S. Application Data

(63) Continuation of application No. PCT/CN2018/102667, filed on Aug. 28, 2018.

(30) Foreign Application Priority Data

Mar. 16, 2018    (WO) ............... PCT/CN2018/079338

(51) Int. Cl.
*G06F 21/54* (2013.01)
*G06F 9/455* (2018.01)
(Continued)

(52) U.S. Cl.
CPC .......... *G06F 21/54* (2013.01); *G06F 9/45545* (2013.01); *G06F 9/45558* (2013.01);
(Continued)

(58) Field of Classification Search
CPC .. G06F 21/54; G06F 9/45545; G06F 9/45558; G06F 21/554; G06F 21/566;
(Continued)

(56) References Cited

U.S. PATENT DOCUMENTS

| 9,521,115 | B1 | 12/2016 | Woolward |
| 2013/0055341 | A1* | 2/2013 | Cooper ............... G06F 21/6281 726/1 |

(Continued)

FOREIGN PATENT DOCUMENTS

| CN | 104915285 A | 9/2015 |
| CN | 105590054 A | 5/2016 |

(Continued)

OTHER PUBLICATIONS

Li et al., A VMM-based System Call Interposition Framework for Program Monitoring, IEEE 2010 16th International Conference on Parallel and Distributed Systems (Year: 2010).*

(Continued)

*Primary Examiner* — Bruce S Ashley
(74) *Attorney, Agent, or Firm* — Conley Rose, P.C.

(57) ABSTRACT

A container escape detection method includes receiving information that is about a plurality of system calls triggered by a monitored container, and matching an occurrence order of the plurality of system calls with at least one group of preset system call orders in an escape detection rule, and determining, based on a matching result, whether the monitored container escapes.

20 Claims, 10 Drawing Sheets

(51) Int. Cl.
    *G06F 21/55* (2013.01)
    *G06F 21/56* (2013.01)
    *G06F 21/57* (2013.01)
(52) U.S. Cl.
    CPC .......... *G06F 21/554* (2013.01); *G06F 21/566* (2013.01); *G06F 21/577* (2013.01); *G06F 2009/45587* (2013.01); *G06F 2009/45591* (2013.01)
(58) Field of Classification Search
    CPC ......... G06F 21/577; G06F 2009/45587; G06F 2009/45591; G06F 21/53
    See application file for complete search history.

(56) References Cited

U.S. PATENT DOCUMENTS

| | | | |
|---|---|---|---|
| 2015/0264077 A1 | 9/2015 | Berger et al. | |
| 2016/0379136 A1* | 12/2016 | Chen | G06F 21/552 706/14 |
| 2017/0054759 A1 | 2/2017 | Lee et al. | |
| 2017/0109536 A1 | 4/2017 | Stopel et al. | |
| 2017/0116415 A1 | 4/2017 | Stopel et al. | |
| 2018/0176244 A1* | 6/2018 | Gervais | H04L 63/1433 |
| 2018/0307850 A1* | 10/2018 | Norris | G06F 21/53 |

FOREIGN PATENT DOCUMENTS

| | | |
|---|---|---|
| CN | 105608374 A | 5/2016 |
| CN | 106778257 A | 5/2017 |
| CN | 107679399 A | 2/2018 |
| WO | 2014116740 A2 | 7/2014 |
| WO | 2016209528 A1 | 12/2016 |

OTHER PUBLICATIONS

Provos, Niels, Improving Host Security with System Call Policies, Center for Information Technology Integration University of Michigan, (Year: 2002).*

Maggi et al., Detecting Intrusions through System Call Sequence and Argument Analysis, IEEE Transaction on Dependable and Secure Computing (Year: 2020).*

Li, B., et al., "A VMM-based System Call Interposition Framework for Program Monitoring," 16th International Conference on Parallel and Distributed System, 2010, 6 pages.

* cited by examiner

CONTAINER ESCAPE DETECTION METHOD, APPARATUS, AND SYSTEM, AND STORAGE MEDIUM

CROSS-REFERENCE TO RELATED APPLICATIONS

This application is a continuation of International Patent Application No. PCT/CN2018/102667 filed on Aug. 28, 2018, which claims priority to International Patent Application No. PCT/CN2018/079338 filed on Mar. 16, 2018. The disclosures of the aforementioned applications are hereby incorporated by reference in their entireties.

TECHNICAL FIELD

This application relates to the field of container security, and in particular, to a container escape detection method, apparatus, and system, and a storage medium.

BACKGROUND

Cloud computing is a computing mode in which a dynamically scalable virtual resource is provided as a service using a network. A platform as a service (PaaS) is a main mode of cloud computing. In the PaaS mode, a cloud computing platform may allocate a host machine cluster to each user, the host machine cluster may include at least one host machine, and the host machine may be a physical machine or a virtual machine. The user may create and run a container based on a container image in a host machine in the allocated host machine cluster. Each container has one independent process running space. Ideally, a process in the container can run only in a process running space of the container. However, when a malicious process exists in the container, the malicious process is likely to be detached from the process running space of the container, and then attack the host machine or another container. This phenomenon is referred to as a container escape.

In related technologies, to prevent a container escape, before a container runs, a host machine may determine whether the container has some sensitive system permissions (for example, the sensitive system permission may be a dac_override_capability system permission). When the host machine determines that the container has a sensitive system permission, the host machine may reject running of the container, to prevent a malicious process in the container from attacking the host machine or another container based on the sensitive system permission.

In a procedure of implementing this application, the inventor finds that another approach has at least the following problem.

In the related technologies, a container can be passively prevented from escaping only before the container runs, but a container escape event that occurs after the container runs cannot be detected or prevented. Therefore, prevention of a container escape is relatively weak.

SUMMARY

This application provides a container escape detection method, apparatus, and system, and a storage medium, to strengthen prevention of a container escape.

According to a first aspect, a container escape detection method in a computing system is provided. The computing system includes at least one host machine, and a container monitoring component and at least one container run on the host machine. The computing system further includes an escape detection component, an escape detection rule is provided for the escape detection component, the escape detection rule includes at least one group of preset system call orders, and each group of preset system call orders correspond to a predicted occurrence order of a plurality of system calls triggered by one container escape behavior. The method includes receiving, by the escape detection component, information that is about a plurality of system calls triggered by a monitored container and that is reported by the container monitoring component, and matching, by the escape detection component, an occurrence order of the plurality of system calls with the at least one group of preset system call orders in the escape detection rule, and determining, based on a matching result, whether the monitored container escapes.

In a container escape procedure, a malicious process in a container continuously attempts to obtain a file handle of a host machine through brute force cracking. After obtaining the file handle of the host machine, the malicious process may tamper with a sensitive file in the host machine, to complete a container escape attack. However, in a procedure of cracking the file handle of the host machine by brute force, the malicious process usually needs to use system calls in the host machine in a specified order. Therefore, the escape detection component may determine a container escape possibility of a first container based on a degree of similarity between an occurrence order of a plurality of system calls in a host machine that are used by a process in a monitored container and a preset system call order. The preset system call order is a predicted occurrence order of a plurality of system calls in the host machine that are used by a malicious process in the container when the container escapes. In this way, the escape detection component can detect a container escape event that occurs after the container runs, thereby strengthening prevention of a container escape.

Specifically, an escape detection rule may be preconfigured for the escape detection component. The escape detection rule includes at least one group of preset system call orders, and each group of system call orders corresponds to a predicted occurrence order of a plurality of system calls triggered by one container escape behavior. After obtaining target order information, the escape detection component may match the target order information with the at least one group of preset system call orders in the escape detection rule, to determine the escape possibility of the first container, namely, a possibility identifier.

Optionally, the escape detection rule further includes at least one predefined high-risk system capability related to a container escape, and the method further includes receiving, by the escape detection component, a startup parameter that is of the monitored container and that is reported by the container monitoring component, where the startup parameter includes a system capability enabled by the monitored container, and determining, by the escape detection component according to the preset escape detection rule and the system capability enabled by the monitored container, whether the monitored container escapes.

Running of a shocker attack requires some specific capabilities for system calls, for example, a capability of using dac_override or a capability of using dac_read_search. When an attacker launches a docker run or shocker attack, some specific system capability parameters are added to a docker run command. The escape detection component may detect a container escape possibility using a system capability enabled by a container in a container startup parameter. A high-risk sensitive system capability is preconfigured in the escape detection rule, and each high-risk system capability corresponds to one escape possibility (one possibility identifier). The container monitoring component may obtain the container startup parameter by invoking a docker.socket interface, and report the container startup parameter to the escape detection component. The container escape detection component determines, according to the preset escape detection rule and the system capability enabled by the monitored container, whether the monitored container escapes. Optionally, the determining, by the escape detection component, whether the monitored container escapes further includes obtaining a target state machine, where the target state machine includes an initial state, a final state, and a state switching condition that needs to be satisfied for switching from the initial state to the final state, and the state switching condition is a condition that an order indicated by input order information is the same as the preset system call order, inputting the target order information into the target state machine when the target state machine is in the initial state, and when the target state machine switches from the initial state to the final state, determining that the first container escapes.

Optionally, the obtaining a target state machine includes obtaining a process identifier of a first process of the monitored container, querying a state machine database based on the process identifier of the first process, where the state machine database stores correspondences between at least one group of state machines and process identifiers, and when the state machine database stores a state machine corresponding to the process identifier of the first process, obtaining the state machine as the target state machine.

Optionally, the obtaining a target state machine further includes, when the state machine database does not store the state machine corresponding to the process identifier of the first process, creating a state machine based on the preset system call order, and obtaining the created state machine as the target state machine.

Optionally, the escape detection rule is expressed using a target decision tree, the target decision tree includes at least one branch, each branch includes a system capability node and a plurality of ordered system call nodes, the system capability node of each branch corresponds to one high-risk system capability, a preset order of the plurality of system call nodes of each branch represents a predicted occurrence order of a plurality of system calls triggered when a container that enables the high-risk system capability described by the system capability node of the branch escapes, and a corresponding possibility identifier is preset for each node of each branch of the target decision tree. The determining, by the escape detection component, whether the monitored container escapes further includes, after receiving the startup parameter of the monitored container, matching, by the escape detection component, each system capability node in the target decision tree according to the obtained system capability enabled by the monitored container, to obtain a first possibility identifier corresponding to a successfully matched system capability node, and using the first possibility identifier as a current possibility identifier of the monitored container, and after receiving the information about the plurality of system calls triggered by the monitored container, determining, by the escape detection component, an actual occurrence order of the plurality of system calls, and matching the actual occurrence order of the plurality of system calls with a preset order of a branch in which the successfully matched system capability node is located, and if matching on an $n^{th}$ system call node of the branch in which the successfully matched system capability node is located succeeds, obtaining a second possibility identifier corresponding to the $n^{th}$ system call node, and updating the current possibility identifier of the monitored container using the second possibility identifier.

Optionally, occurrence frequency information may be further provided for each node in the target decision tree, occurrence frequency provided for each node represents a requirement on a quantity of times that an event corresponding to the node occurs, and a possibility identifier (an escape coefficient) provided for the node can be determined as the current possibility identifier of the monitored container only when the requirement on the quantity of times is met. For example, if a node a1 is a system permission node, and occurrence frequency provided for the node a1 is 1, it indicates that provided that the monitored container enables a system permission dac_override_capability corresponding to the node a1, it can be determined that an escape possibility of the monitored container is 4 indicated by a possibility identifier. If a node a2 is a system call node, and occurrence frequency provided for the node a2 is 2, it indicates that only when occurrence frequency of a system call open_by_handle_at used by the monitored container is 2, it can be determined that an escape possibility of the monitored container is 5 indicated by a possibility identifier of the node. For occurrence frequency of another node, deduction can be performed by analogy, and details are not described again.

In a container escape procedure, a malicious process in a container usually needs to use system calls in a host machine in a specified order, and a process in the container can use a system call in the host machine only when the container has some system permissions. Therefore, in this embodiment of this application, the escape detection component may determine the container escape possibility of the first container based on a system permission of the monitored container and a degree of similarity between an order indicated by the target order information and a preset system call order.

Optionally, the method further includes receiving sensitive file tampering information sent by the container monitoring component, where the sensitive file tampering information is sent by the container monitoring component after the container monitoring component detects that a second process in the monitored container performs a write operation on any one of at least one sensitive file preset in the host machine, and determining, based on the sensitive file tampering information, that the monitored container escapes.

When performing a container escape attack, a malicious process in a container tampers with a sensitive file in a host machine. Therefore, after the escape detection component receives the sensitive file tampering information sent by the container monitoring component, the escape detection component may determine that the monitored container escapes.

Optionally, before the receiving sensitive file tampering information sent by the container monitoring component, the method further includes sending sensitive file configuration information to the container monitoring component, where the sensitive file configuration information includes an identifier of at least one sensitive file, and the sensitive file configuration information is used by the container monitoring component to determine the at least one sensitive file based on the sensitive file configuration information.

Optionally, the method further includes sending, by the escape detection component, a container escape event report or an escape alarm based on whether the monitored container escapes, and optionally, the method further includes receiving illegal process running information sent by the container monitoring component, where the illegal process running information is sent by the container monitoring component after the container monitoring component detects that a process identifier of a third process running in the monitored container does not belong to process identifiers included in a process whitelist, and the process whitelist includes process identifiers of a plurality of legal processes, and determining, based on the illegal process running information, that the monitored container probably escapes.

After a target container monitoring component detects that the process identifier of the third process running in the monitored container does not belong to the process identifiers included in the process whitelist, the container monitoring component may send the illegal process running information to the escape detection component. After receiving the illegal process running information, the escape detection component may determine that an illegal process exists in the monitored container. Because the illegal process is likely to be a malicious process, after receiving the illegal process running information, the escape detection component may determine that the monitored container probably escapes.

Optionally, the system further includes a client, and before the receiving illegal process running information sent by the container monitoring component, the method further includes receiving a correspondence that is between a container image in the host machine and a process and that is sent by the container monitoring component, sending the correspondence to the client, receiving the edited correspondence sent by the client, generating the process whitelist based on the edited correspondence, and sending the process whitelist to the container monitoring component.

Optionally, the escape detection component is disposed on a second host machine in the host machine cluster, and a computing capability of the second host machine is greater than that of at least one host machine other than the second host machine in the target host machine cluster.

Optionally, the escape detection component is disposed in a container deployed on the second host machine.

Optionally, the container escape detection system includes an escape detection component cluster, the escape detection component cluster includes a plurality of escape detection components, and the escape detection component cluster is deployed in a trusted zone inside a firewall.

According to a second aspect, a container escape detection method is provided. The computing system includes at least one host machine, and a container monitoring component and at least one container run on the host machine. The computing system further includes an escape detection component, an escape detection rule is provided for the escape detection component, the escape detection rule includes at least one group of preset system call orders, and each group of system call orders corresponds to a predicted occurrence order of a plurality of system calls triggered by one container escape behavior.

The method includes monitoring, by the container monitoring component, a running status of a monitored container, and reporting, by the container monitoring component to the escape detection component, information about a plurality of system calls triggered by the monitored container, where an occurrence order of the plurality of system calls is used to match the escape detection rule to determine whether the monitored container escapes.

Optionally, the method includes reporting, by the container monitoring component, information about the monitored container to the escape detection component, where the information about the monitored container includes an ID of the monitored container or an ID of a process started by the monitored container, and receiving, by the container monitoring component, an audit rule delivered by the escape detection component based on the information about the monitored container, where the audit rule instructs the container monitoring component to audit a system call event of the monitored container, and the reporting, by the container monitoring component to the escape detection component, information about a plurality of system calls triggered by the monitored container includes reporting, by the container monitoring component, an audit report to the escape detection component after detecting a system call event triggered by the monitored container, where the audit report carries the information about the plurality of system calls triggered by the monitored container.

Optionally, the escape detection rule further includes at least one predefined high-risk system capability related to a container escape, and the method further includes sending a startup parameter of the monitored container to the escape detection component, where the startup parameter includes a system capability enabled by the monitored container, and the system capability enabled by the monitored container is used to match the escape detection rule to determine whether the monitored container escapes. Specifically, the startup parameter includes at least one piece of system capability information, each piece of system capability information is used to indicate one system capability of the monitored container, and the startup parameter is used by the escape detection component to determine a container escape possibility of the monitored container based on the startup parameter.

Optionally, the reporting, by the container monitoring component, a startup parameter of the monitored container to the escape detection component includes invoking, by the container monitoring component, a docker socket interface to obtain the startup parameter of the monitored container, and reporting, to the escape detection component, a docker run command that carries the startup parameter of the monitored container. Optionally, the method further includes sending sensitive file tampering information to the escape detection component after it is detected that a second process in the monitored container performs a write operation on any one of at least one sensitive file preset in a first host machine, where the sensitive file tampering information is used by the escape detection component to determine, based on the sensitive file tampering information, that the monitored container escapes, and the monitored container is a container deployed on the first host machine.

Optionally, before the sending sensitive file tampering information to the escape detection component, the method further includes receiving sensitive file configuration information sent by the escape detection component, where the sensitive file configuration information includes an identifier of at least one sensitive file, and determining the at least one sensitive file based on the sensitive file configuration information.

Optionally, the method further includes sending illegal process running information to the escape detection component after it is detected that a process identifier of a third process running in the monitored container does not belong to process identifiers included in a process whitelist, where the illegal process running information is used by the escape detection component to determine, based on the illegal process running information, that the monitored container probably escapes, the process whitelist includes process identifiers of a plurality of legal processes, and the monitored container is a container deployed on the first host machine.

Optionally, the container escape detection system further includes a client, and before the sending illegal process running information to the escape detection component, the method further includes sending a correspondence between a container image in the first host machine and a process to the escape detection component such that the escape detection component sends the correspondence to the client, and receives the edited correspondence returned by the client, and receiving the process whitelist, where the process whitelist is generated by the escape detection component based on the edited correspondence.

Optionally, the escape detection component is disposed on a second host machine in a host machine cluster in which the monitored container is located, and a computing capability of the second host machine is greater than that of at least one host machine other than the second host machine in the host machine cluster in which the monitored container is located.

Optionally, the escape detection component is disposed in a container deployed on the second host machine.

Optionally, the container escape detection system includes an escape detection component cluster, the escape detection component cluster includes a plurality of escape detection components, and the escape detection component cluster is deployed in a trusted zone inside a firewall.

Optionally, the container monitoring component is disposed in a container deployed on a host machine on which the monitored container is located.

According to a third aspect, a container escape detection apparatus is provided. The apparatus includes at least one module, and the at least one module is configured to implement the container escape detection method provided in any one of the first aspect and the optional manners of the first aspect.

According to a fourth aspect, a container escape detection apparatus is provided. The apparatus includes at least one module, and the at least one module is configured to implement the container escape detection method provided in any one of the second aspect and the optional manners of the second aspect.

According to a fifth aspect, a container escape detection apparatus is provided. The apparatus includes a processor and a memory.

The processor is configured to execute an instruction stored in the memory, and the processor executes the instruction to implement the container escape detection method provided in any one of the first aspect and the optional manners of the first aspect.

According to a sixth aspect, a container escape detection apparatus is provided. The apparatus includes a processor and a memory.

The processor is configured to execute an instruction stored in the memory, and the processor executes the instruction to implement the container escape detection method provided in any one of the second aspect and the optional manners of the second aspect.

According to a seventh aspect, a container escape monitoring method is provided. The computing system includes at least one host machine, and a container monitoring component and at least one container run on the host machine. The computing system further includes an escape detection component, an escape detection rule is provided for the escape detection component, and the escape detection rule includes at least one predefined high-risk system capability related to a container escape. The method includes receiving, by the escape detection component, a startup parameter that is of a monitored container and that is reported by the container monitoring component, where the startup parameter includes a system capability enabled by the monitored container, and determining, by the escape detection component according to the preset escape detection rule and the system capability enabled by the monitored container, whether the monitored container escapes.

Optionally, the escape detection rule further includes at least one group of preset system call orders, and each group of system call orders corresponds to a predicted occurrence order of a plurality of system calls triggered by one container escape behavior. The method further includes receiving, by the escape detection component, information that is about a plurality of system calls triggered by the monitored container and that is reported by the container monitoring component, and matching, by the escape detection component, an occurrence order of the plurality of system calls with the at least one group of preset system call orders in the escape detection rule, and determining, based on a matching result, whether the monitored container escapes.

Optionally, the container escape detection method further performs the possible implementations of the first aspect.

According to an eighth aspect, a container escape monitoring method is provided. The computing system includes at least one host machine, and a container monitoring component and at least one container run on the host machine. The computing system further includes an escape detection component, an escape detection rule is provided for the escape detection component, and the escape detection rule further includes at least one predefined high-risk system capability related to a container escape. The method includes monitoring, by the container monitoring component, a running status of a monitored container, and reporting, by the container monitoring component, a startup parameter of the monitored container to the escape detection component after detecting that the monitored container is started, where the startup parameter includes a system capability enabled by the monitored container, and the system capability enabled by the monitored container is used to match the escape detection rule to determine whether the monitored container escapes.

Optionally, the reporting, by the container monitoring component, a startup parameter of the monitored container to the escape detection component includes invoking, by the container monitoring component, a docker socket interface to obtain the startup parameter of the monitored container, and reporting, to the escape detection component, a docker run command that carries the startup parameter of the monitored container.

Optionally, the escape detection rule further includes at least one group of preset system call orders, and each group of system call orders corresponds to a predicted occurrence order of a plurality of system calls triggered by one container escape behavior. The method further includes reporting, by the container monitoring component to the escape detection component, information about a plurality of system calls triggered by the monitored container, where an occurrence order of the plurality of system calls is used to match the escape detection rule to determine whether the monitored container escapes. According to a ninth aspect, a computer readable storage medium or a computer program product is provided. The computer readable storage medium stores an instruction, and when the instruction runs on a computer, the computer is enabled to perform the container escape detection method provided in any one of the first aspect and the optional manners of the first aspect, or the computer is enabled to perform the container escape detection method provided in any one of the second aspect and the optional manners of the second aspect, or the computer is enabled to perform the container escape detection method provided in any one of the seventh aspect and the optional manners of the seventh aspect, or the computer is enabled to perform the container escape detection method provided in any one of the eighth aspect and the optional manners of the eighth aspect.

According to a tenth aspect, a container escape detection system is provided. The container escape detection system includes the escape detection component in any one of the first aspect and the container monitoring component in any one of the second aspect.

According to an eleventh aspect, a container escape detection system is provided. The container escape detection system includes the escape detection component in any one of the seventh aspect and the container monitoring component in any one of the eighth aspect. Beneficial effects of the technical solutions provided in this application are as follows.

An escape detection component and a container monitoring component are disposed in a computing system. The container monitoring component monitors a running status of a monitored container, and reports a related monitoring event to the escape detection component. The escape detection component presets an escape detection rule, and the escape detection component determines, based on the reported monitoring event and the preset escape detection rule, whether the monitored container escapes. When the monitoring event is information about a plurality of system calls triggered by the monitored container, the escape detection component matches an occurrence order of the plurality of system calls with a preset system call order in the escape detection rule, and determines, based on a matching degree, whether the monitored container escapes. When the monitoring event is a system capability enabled by the monitored container, the escape detection component matches the system capability enabled by the monitored container with a preset high-risk system capability in the escape detection rule, and determines, based on a matching degree, whether the monitored container escapes. Detection of use of a high-risk system capability and detection of an order of system calls triggered by the monitored container may also be combined. Therefore, monitoring and detection of a container escape behavior implement warning and prevention of a container escape attack in a container execution procedure, thereby ensuring running security of a cloud computing system.

DESCRIPTION OF EMBODIMENTS

To make the objectives, technical solutions, and advantages of this application clearer, the following further describes the implementations of this application in detail with reference to the accompanying drawings.

Cloud computing is a computing mode in which a dynamically scalable virtual resource is provided as a service using a network. A PaaS is a main mode of cloud computing.

In the PaaS mode, a plurality of users may be registered on a cloud computing platform. The cloud computing platform may allocate one host machine cluster to each user, and the host machine cluster may include at least one host machine. The host machine is a concept relative to a container. The host machine is a device on which a container is deployed. In an embodiment, the host machine may be a physical machine (for example, a server), or may be a virtual machine.

A user in the PaaS mode may deploy a container on a host machine in a host machine cluster allocated by the cloud computing platform to the user, to perform a corresponding operation using the deployed container. In a procedure of deploying the container, the user may download a container image from an image software repository of the cloud computing platform and create the container on the host machine based on the downloaded container image. The container image may include at least one readable but non-writable file layer. When the container is being created, the host machine may create a readable and writable file layer in the container image, and create an independent process running space. A process in the container may run in the process running space, and the running process may read a file at the at least one readable but non-writable file layer, or may perform a write operation on a file at the readable and writable file layer.

Generally, the cloud computing platform may allow a common user to upload a container image to the image software repository. Therefore, security of the container image in the image software repository is difficult to be ensured. Consequently, a malicious process probably exists in a container created based on the container image in the image software repository, and the malicious process is likely to be detached from a process running space of the container, and then attack a host machine of the container or another container. This phenomenon is usually referred to as a container escape.

Figure 1A:
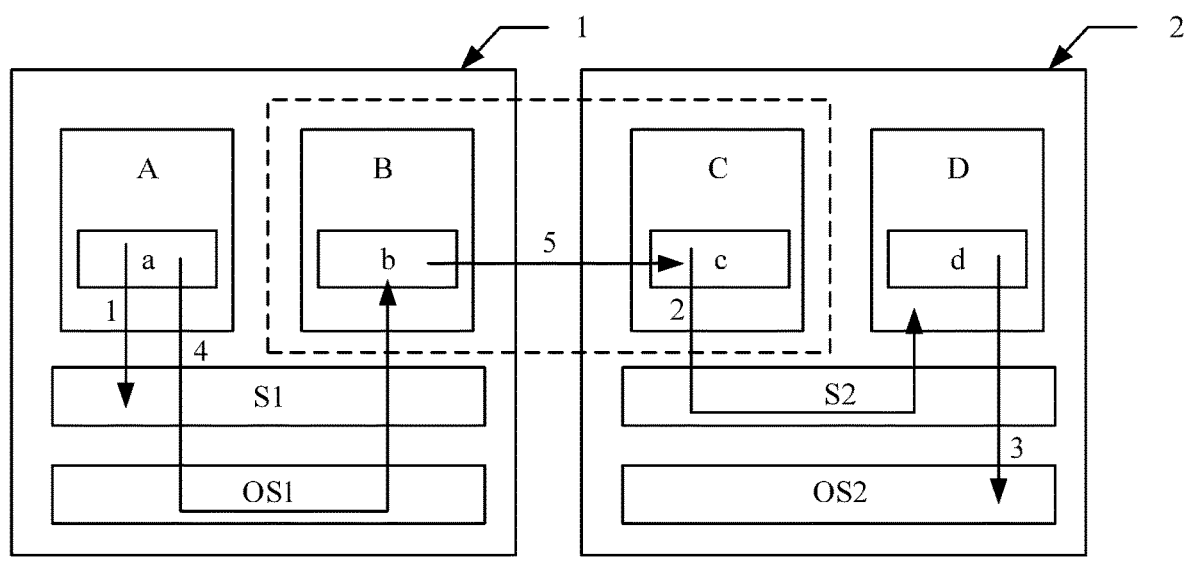
FIG. 1A is a schematic diagram of a path of a container escape attack according to an embodiment of this application.

As shown in FIG. 1A, in an embodiment, a container escape may usually have the following attack paths.

1. A malicious process in a container attacks a container daemon process (docker daemon).

As shown in an attack path 1 in FIG. 1A, a malicious process a in a container A deployed on a host machine 1 may attack the container A. After attacking the container A, the malicious process a may be detached from a process running space of the container A, and attack a container daemon process S1.

2. A malicious process in a container attacks, using a container daemon process, another container deployed on a host machine.

As shown in an attack path 2 in FIG. 1A, a malicious process c in a container C deployed on a host machine 2 may attack the container C. After attacking the container C, the malicious process c may be detached from a process running space of the container C, and attack a container daemon process S2. After attacking the container daemon process S2, the malicious process c may attack a container D deployed on the host machine 2.

3. A malicious process in a container attacks an operating system (OS) of a host machine.

As shown in an attack path 3 in FIG. 1A, a malicious process d in a container D deployed on a host machine 2 may attack the container D. After attacking the container D, the malicious process d may be detached from a process running space of the container D, and attack an operating system OS2 of the host machine 2 using a container shared library.

4. A malicious process in a container attacks another container using an operating system of a host machine.

As shown in an attack path 4 in FIG. 1A, a malicious process a in a container A deployed on a host machine 1 may attack the container A. After attacking the container A, the malicious process a may be detached from a process running space of the container A, and upload a virus to a shared storage volume of an operating system OS1 of the host machine 1. A process b in a container B deployed on the host machine 1 reads and executes the virus uploaded by the malicious process a to the shared storage volume, and then is infected.

5. A malicious process in a container attacks another container in a same group as the container.

As shown in an attack path 5 in FIG. 1A, a malicious process b in a container B deployed on a host machine 1 may attack the container B. After attacking the container B, the malicious process b may be detached from a process running space of the container B, and attack a container C in a same group as the container B.

A container escape brings a relatively high security risk to a host machine and a container. Therefore, prevention of a container escape has become an important part of ensuring security of the cloud computing platform.

Generally, a malicious process in a container usually needs to attack a host machine or another container based on some sensitive system permissions of the container. For example, the sensitive system permission may be dac_override_capability or dac_read_search_capability. Therefore, in related technologies, to prevent a container escape, before a container runs, a host machine may determine whether the container has some sensitive system permissions. When the host machine determines that the container has a sensitive system permission, the host machine may determine that the container may probably escape. Therefore, the host machine may reject running of the container, to prevent the container from escaping.

However, in the related technologies, a container can be passively prevented from escaping only before the container runs, but a container escape event that occurs after the container runs cannot be detected or prevented. Therefore, prevention of a container escape is relatively weak.

An embodiment of this application provides a container escape detection method. The container escape detection method may be used to detect a container escape event that occurs after a container runs. Therefore, prevention of a container escape can be strengthened.

Figure 1B:
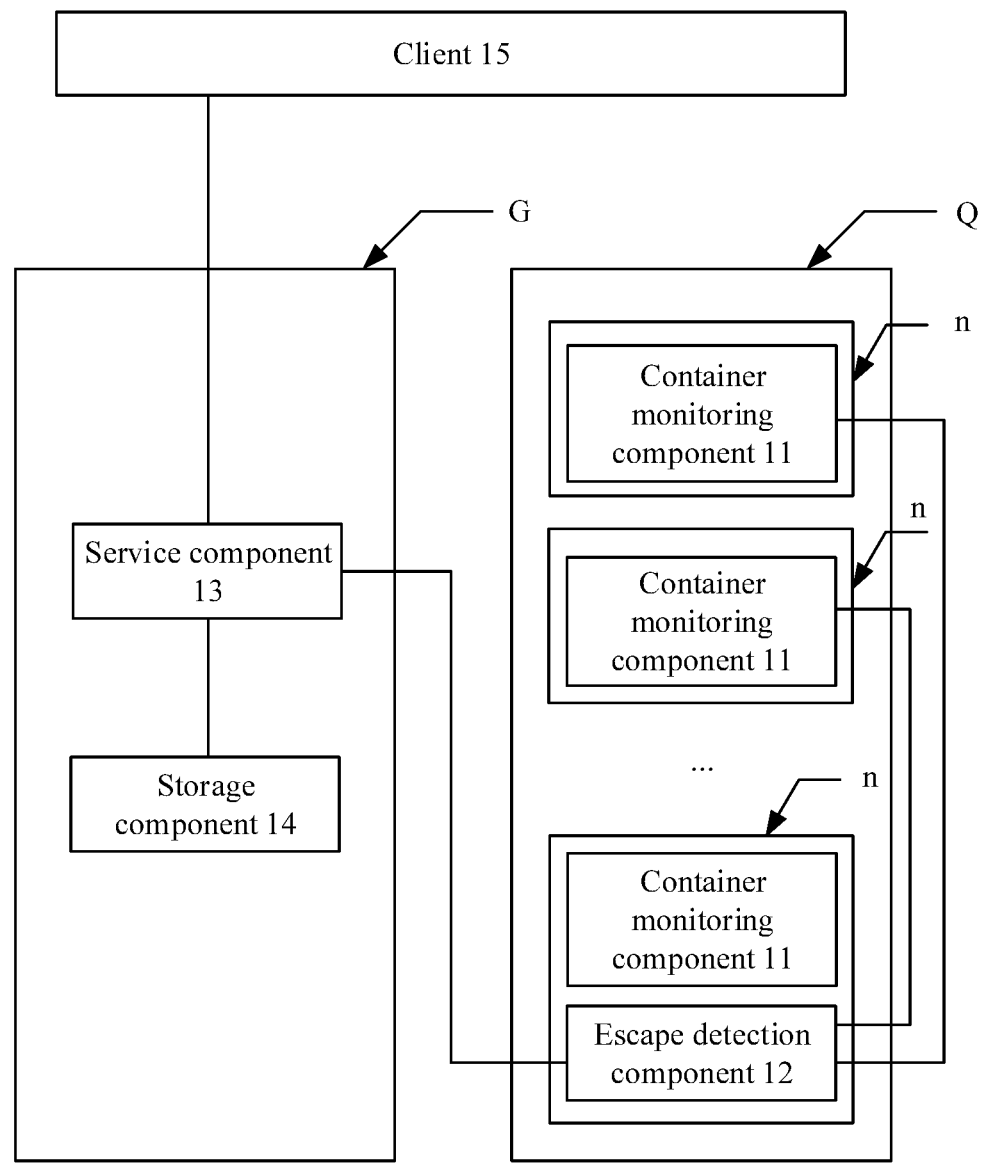
FIG. 1B is a schematic diagram of an implementation environment according to an embodiment of this application.

FIG. 1B is a schematic diagram of an implementation environment related to a container escape detection method according to an embodiment of this application. As shown in FIG. 1B, the implementation environment may include at least one container monitoring component 11 (FIG. 1B shows only three container monitoring components 11), an escape detection component 12, a service component 13, a storage component 14, and a client 15.

As shown in FIG. 1B, for a host machine cluster Q allocated by a cloud computing platform to a user A, one container monitoring component 11 may be disposed on each host machine n in the host machine cluster Q. Optionally, a container monitoring component 11 on a host machine may be disposed in a container deployed on the host machine. A container monitoring component 11 disposed on a host machine may monitor a container deployed on the host machine, and send a monitoring result to the escape detection component 12.

The escape detection component 12 may be disposed on a host machine in the host machine cluster Q. Optionally, the escape detection component 12 may be disposed in a container deployed on the host machine. It should be noted that the escape detection component 12 may be usually disposed on a host machine with a relatively strong computing capability in the host machine cluster Q. In an embodiment, the escape detection component 12 may be disposed on a host machine with a strongest computing capability in the host machine cluster Q. The escape detection component 12 may receive a monitoring result sent by each container monitoring component 11 disposed in the host machine cluster Q, and may determine a container escape possibility of a container on each host machine in the host machine cluster Q based on the received monitoring result. The escape detection component 12 may further send a container escape event report to the service component 13, where the container escape event report may include a container escape possibility of a container on a host machine in the host machine cluster Q.

The service component 13 and the storage component 14 may be disposed in a trusted zone G inside a firewall. The service component 13 may receive the container escape event report sent by the escape detection component 12, and the service component 13 may store the received container escape event report in the storage component 14.

The client 15 may be a web client or an application program client. The client 15 may send a query request to the service component 13 under trigger of the user A, to query the container escape event report of the host machine cluster Q. After receiving the query request sent by the client 15, the service component 13 may obtain the container escape event report of the host machine cluster Q from the storage component 14, and send the container escape event report to the client 15.

Figure 1C:
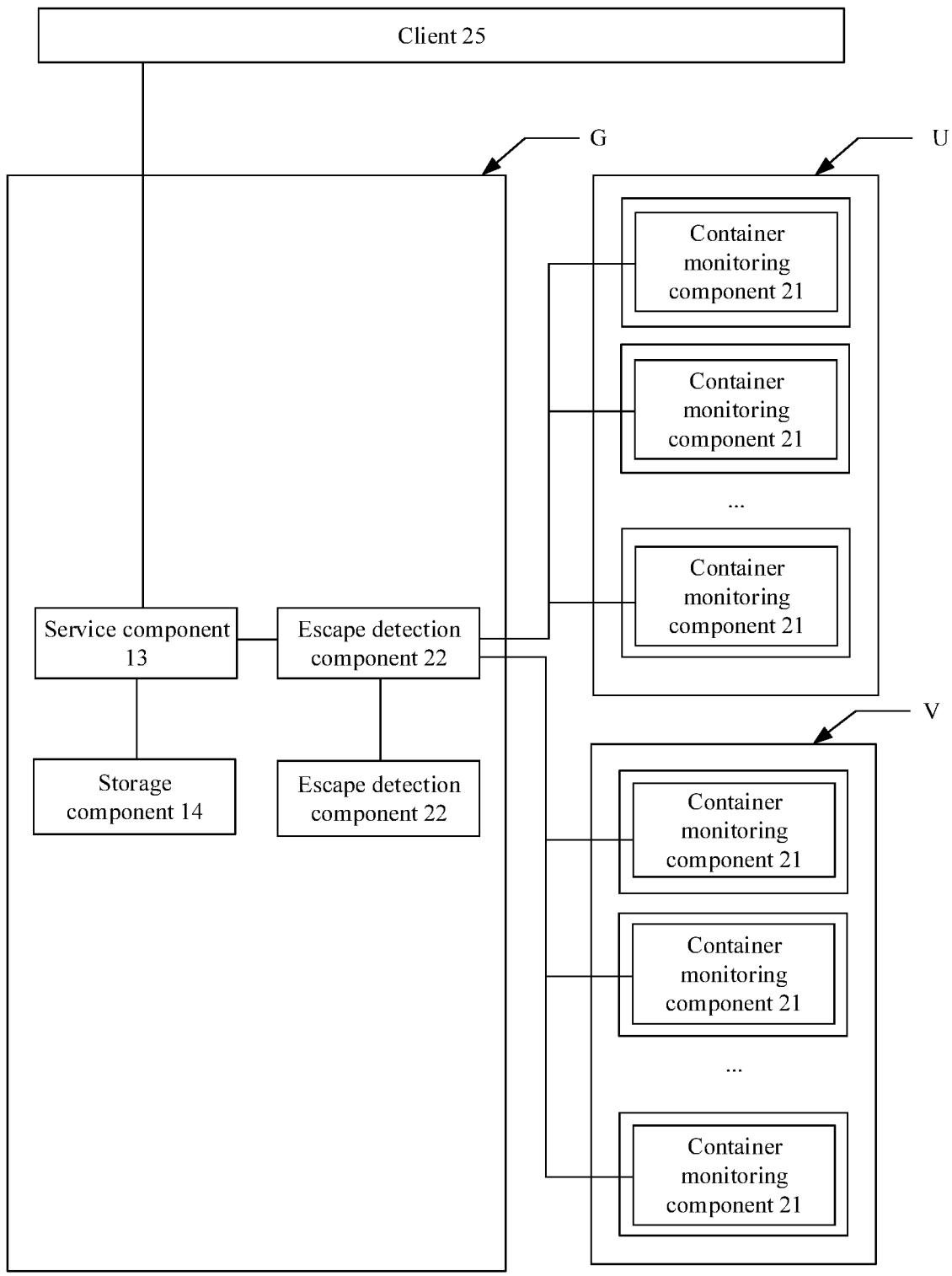
FIG. 1C is a schematic diagram of another implementation environment according to an embodiment of this application.

FIG. 1C is a schematic diagram of another implementation environment related to a container escape detection method according to an embodiment of this application. As shown in FIG. 1C, the implementation environment may include at least one container monitoring component 21, an escape detection component 22, a service component 23, a storage component 24, and a client 25.

Deployment manners of the container monitoring component 21, the service component 23, the storage component 24, and the client 25 are respectively the same as those of the container monitoring component 11, the service component 13, the storage component 14, and the client 15 shown in FIG. 1B, and technical procedures performed by the container monitoring component 21, the service component 23, the storage component 24, and the client 25 are respectively similar to those performed by the container monitoring component 11, the service component 13, the storage component 14, and the client 15 shown in FIG. 1B.

Different from the escape detection component 12 in FIG. 1B, the escape detection component 22 in FIG. 1C is disposed in a trusted zone G inside a firewall, and the escape detection component 22 may receive monitoring results sent by container monitoring components 21 in a plurality of host machine clusters (FIG. 1C shows only two host machine clusters U and V), and may determine container escape possibilities of host machines in the plurality of host machine clusters based on the received monitoring results. Optionally, to ensure high availability (HA) of the escape detection component 22, a plurality of escape detection components 22 may be deployed in the implementation environment shown in FIG. 1C (FIG. 1C shows only two escape detection components 22). In this way, it can be ensured that a fault of an escape detection component 22 does not affect detection of a container escape.

Figure 2A:
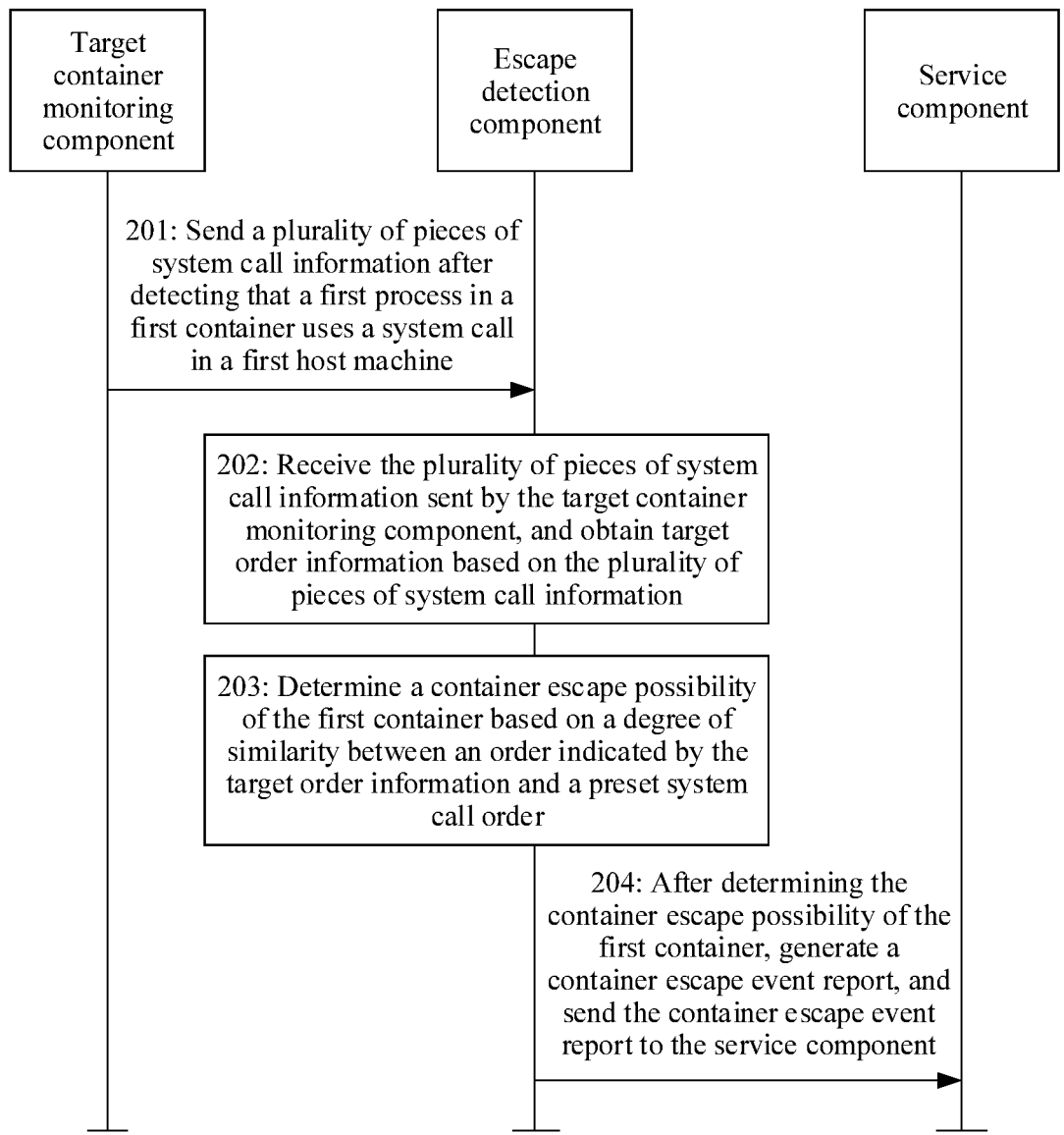
FIG. 2A is a flowchart of a container escape detection method according to an embodiment of this application.

FIG. 2A is a flowchart of a container escape detection method according to an embodiment of this application. The container escape detection method may be applied to the implementation environment shown in FIG. 1B or FIG. 1C. As shown in FIG. 2A, the container escape detection method may include the following steps.

Step 201. A target container monitoring component sends a plurality of pieces of system call information to an escape detection component after detecting that a first process in a first container uses a system call in a first host machine.

As described above, the implementation environment related to the container escape detection method provided in this embodiment of this application may include at least one container monitoring component. Each container monitoring component may be disposed on one host machine in a host machine cluster, and is configured to monitor a container on the host machine. When container escape detection is performed, technical procedures performed by all container monitoring components are similar. Therefore, in this embodiment of this application, only one container monitoring component (namely, the target container monitoring component) in the at least one container monitoring component is used as an example to describe the container escape detection method provided in this embodiment of this application.

The first host machine may be a host machine in a host machine cluster on which container escape detection is to be performed. In other words, the first host machine may be a host machine in a host machine cluster allocated by a cloud computing platform to a user. The target container monitoring component is a container monitoring component disposed on the first host machine, the first container is a container deployed on the first host machine (the first container is any one of a plurality of monitored containers), and the first process is a process running in the first container.

In a container escape procedure, a malicious process in a container continuously attempts to obtain a file handle of a host machine through brute force cracking. After obtaining the file handle of the host machine, the malicious process may tamper with a sensitive file in the host machine, to complete a container escape attack. However, in a procedure of cracking the file handle of the host machine by brute force, the malicious process usually needs to use system calls in the host machine in a specified order. For example, the malicious process may use the system calls in the host machine in the following order open_by_handle_at, fstat, fcntl, getdents, and open_by_handle_at. Therefore, in a procedure of performing container escape detection, a container monitoring component needs to monitor a system call event in a container deployed on a host machine, and send a monitoring result to the escape detection component such that the escape detection component determines a container escape possibility of the container on the host machine based on the monitoring result.

In step 201, the target container monitoring component may monitor a system call event in a container deployed on the first host machine. When detecting that the first process in the first container uses the system call in the first host machine, the target container monitoring component may generate the plurality of pieces of system call information, and send the plurality of pieces of system call information to the escape detection component such that the escape detection component determines a container escape possibility of the first container based on the plurality of pieces of system call information. Each piece of system call information may correspond to one system call that is in the first host machine and that is used by the first process, and each piece of system call information may include an identifier of a corresponding system call.

In a LINUX system, an audit module may be used to monitor the system call event in the container deployed on the first host machine. A plurality of audit rules may be configured in the audit module, and each audit rule may be a rule for a process in a container to use a system call in a host machine. When the first process triggers the audit rule, that is, when the first process uses the system call in the first host machine, the audit module may generate an audit report, and send the audit report to the target container monitoring component. After receiving the audit report, the target container monitoring component may generate system call information based on the audit report, and send the system call information to the escape detection component. The following is an example of an audit report:

arch=c00003e syscall=304 success=no exit=−116 a0=3 a1=7ffecb757ac0 a2=0 a3=4 item=0 ppid=24057 pid=24785 auid=4294967295 uid=0 gid=0 euid=0 suid=0 fsuid=0 egid=0 sgid=0 tty=pts3 ses=4284967295 comm="shocker"exe="/app/shocker"subj=system_u:system_r:spc_t:s0 key=67fd5ccc277e19114d7c4516b71743180149b26bc7-45c94e23c60bb8c933543_gra_highrisk_syscall_24057.

In this audit report, the field syscall=304 indicates that the first process uses a system call whose number is 304 in the first host machine, and the system call is open_by_handle_at.

The field success=no indicates that the first process fails to use the system call whose number is 304 in the first host machine.

The field key=67fd5ccc277e19114d7c451-6b71743180149b26bc745c94e23c60bb8c933543_gra_highrisk_syscall_24057 indicates that the audit rule triggered by the first process is =67fd5ccc277e19-114d7c4516b71743180149b26bc745c94e23c60bb8c9-33543_gra_highrisk_syscall_24057.

Step 202. The escape detection component receives the plurality of pieces of system call information sent by the target container monitoring component, and obtains target order information based on the plurality of pieces of system call information.

The target order information is used to indicate an order in which the first process uses a plurality of system calls in the first host machine. In this application, the target order information is an expression, and the target order information is an occurrence order of n system calls triggered by the first container (a monitored container).

In a possible implementation, each piece of system call information may further carry a generation time, and the generation time is used to indicate a time at which the target container monitoring component generates the system call information. The escape detection component may obtain, based on the generation time carried in each piece of system call information, an occurrence order of a plurality of system calls corresponding to the plurality of pieces of system call information, and then the escape detection component may generate target order information based on the order of the plurality of system calls corresponding to the plurality of pieces of system call information. The occurrence order of the plurality of system calls corresponding to the plurality of pieces of system call information is the order indicated by the target order information. In this application, the occurrence order of the plurality of system calls may be determined based on a generation time of each system call, or may be determined based on a trigger time of each system call, or may be determined based on an execution time of each system call, or may be determined based on a receiving time of each system call.

For example, the escape detection component receives three pieces of system call information sent by the target container monitoring component, and the three pieces of system call information are system call information a, system call information b, and system call information c. The system call information a corresponds to a system call p used by the first process, and a generation time carried in the system call information a is 14:00. The system call information b corresponds to a system call q used by the first process, and a generation time carried in the system call information b is 14:01. The system call information c corresponds to a system call k used by the first process, and a generation time carried in the system call information c is 14:02. In this case, the escape detection component may obtain, based on the generation times carried in the three pieces of system call information, an occurrence order of the three system calls corresponding to the three pieces of system call information, and the occurrence order is the system call p, the system call q, and the system call k. Then, the escape detection component may generate target order information based on the order, and an order indicated by the target order information is the system call p, the system call q, and the system call k.

In another possible implementation, the escape detection component may obtain, based on an order of receiving the plurality of pieces of system call information, an order of a plurality of system calls corresponding to the plurality of pieces of system call information. Then, the escape detection component may generate target order information based on the order of the plurality of system calls corresponding to the plurality of pieces of system call information, where the order of the plurality of system calls corresponding to the plurality of pieces of system call information is an order indicated by the target order information.

For example, the escape detection component receives three pieces of system call information sent by the target container monitoring component, and the three pieces of system call information are system call information a, system call information b, and system call information c. The system call information a corresponds to a system call p used by the first process, and the escape detection component receives the system call information a at 14:00. The system call information b corresponds to a system call q used by the first process, and the escape detection component receives the system call information b at 14:01. The system call information c corresponds to a system call k used by the first process, and the escape detection component receives the system call information c at 14:02. In this case, the escape detection component may obtain, based on an order of receiving the three pieces of system call information, an order of the three system calls corresponding to the three pieces of system call information, and the order is the system call p, the system call q, and the system call k. Then, the escape detection component may generate target order information based on the order, and an order indicated by the target order information is the system call p, the system call q, and the system call k.

Step 203. The escape detection component determines a container escape possibility of the first container based on a degree of similarity between an order indicated by the target order information and a preset system call order.

The preset system call order is an order in which a malicious process in a container uses a plurality of system calls in a host machine when the container escapes. In an embodiment, the preset system call order may be set by a person skilled in the art based on an order in which a malicious process in a container in a known container escape event uses a plurality of system calls in a host machine. For example, a relatively common container escape attack is a shocker attack. In this case, a skilled person may set the preset system call order based on an order in which a malicious process uses system calls when the shocker attack occurs.

As described above, in a container escape procedure, a malicious process usually needs to use system calls in a host machine in a specified order. Therefore, the escape detection component may determine the container escape possibility of the first container based on a degree of similarity between the order in which the first process uses the plurality of system calls in the first host machine (namely, the order indicated by the target order information) and the preset system call order.

Generally, a higher degree of similarity between the order indicated by the target order information and the preset system call order indicates a higher container escape probability of the first container, and a lower degree of similarity between the order indicated by the target order information and the preset system call order indicates a lower container escape probability of the first container.

This embodiment of this application provides two manners of determining the container escape possibility of the first container based on the degree of similarity between the order indicated by the target order information and the preset system call order. The following separately describes the two manners in this embodiment of this application.

In a first manner, the escape detection component determines the degree of similarity between the order indicated by the target order information and the preset system call order based on a state machine, and determines the container escape possibility of the first container based on the degree of similarity.

The state machine is a mathematical model, and the mathematical model may include a finite quantity of states and a state switching condition that needs to be satisfied for mutual switching between these states. The finite quantity of states may include an initial state and a final state, or the finite quantity of states may include an initial state, a final state, and at least one intermediate state. The state machine may output corresponding information when switching to the final state.

In this embodiment of this application, the escape detection component may query a state machine database based on an identifier of the first process. When the state machine database stores a state machine corresponding to the identifier of the first process, the escape detection component may obtain the state machine as a target state machine. When the state machine database does not store the state machine corresponding to the identifier of the first process, the escape detection component may create a state machine based on the preset system call order, and obtain the created state machine as the target state machine. The state machine database stores correspondences between at least one group of state machines and process identifiers, the target state machine includes an initial state, a final state, and a state switching condition that needs to be satisfied for switching from the initial state to the final state, and the state switching condition is a condition that an order indicated by input order information is the same as the preset system call order.

In an embodiment, in addition to the initial state and the final state, the target state machine may include at least one intermediate state. Correspondingly, in this case, the state switching condition may include a plurality of subconditions, the plurality of subconditions may include a subcondition that needs to be satisfied for switching from the initial state to an intermediate state adjacent to the initial state, a subcondition that needs to be satisfied for switching between two adjacent intermediate states, and a subcondition that needs to be satisfied for switching from an intermediate state adjacent to the final state to the final state.

Figure 2B:
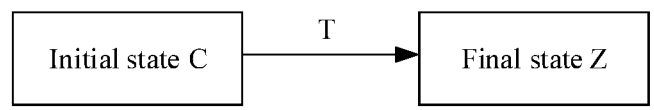
FIG. 2B is a schematic diagram of a target state machine according to an embodiment of this application.

For example, as shown in FIG. 2B, the target state machine may include an initial state C, a final state Z, and a state switching condition T that needs to be satisfied for switching from the initial state C to the final state Z, and the state switching condition T is a condition that an order indicated by input order information is system calls a, b, c, d, e, and f. The preset system call order is an order of the system calls a, b, c, d, e, and f.

Figure 2C:
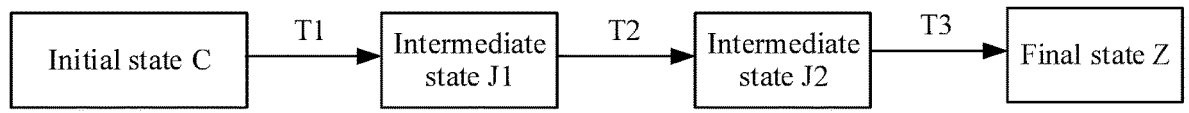
FIG. 2C is a schematic diagram of another target state machine according to an embodiment of this application.

For another example, as shown in FIG. 2C, the target state machine may include an initial state C, an intermediate state J1, an intermediate state J2, and a final state Z, the target state machine may further include a subcondition T1 that needs to be satisfied for switching from the initial state C to the intermediate state J1, a subcondition T2 that needs to be satisfied for switching from the intermediate state J1 to the intermediate state J2, and a subcondition T3 that needs to be satisfied for switching from the intermediate state J2 to the final state Z, and the subconditions T1, T2, and T3 form a state switching condition. The subcondition T1 is a condition that the first two system calls in an order indicated by input order information are a and b, the subcondition T2 is a condition that two intermediate system calls indicated by the input order information are c and d, and the subcondition T3 is a condition that the last two system calls indicated by the input order information are e and f. The preset system call order is an order of the system calls a, b, c, d, e, and f.

After obtaining the target state machine, the escape detection component may determine the degree of similarity between the order indicated by the target order information and the preset system call order based on the target state machine, and determine the container escape possibility of the first container based on the degree of similarity.

Optionally, the escape detection component may input the target order information into the target state machine when the target state machine is in the initial state. When the target state machine switches from the initial state to the final state, it indicates that the order indicated by the target order information is the same as the preset system call order. Therefore, the escape detection component may determine that the degree of similarity between the order indicated by the target order information and the preset system call order is 100%. In this case, the escape detection component may determine that the first container escapes.

In a second manner, the escape detection component determines the container escape possibility of the first container based on a system permission of the first container and the degree of similarity between the order indicated by the target order information and the preset system call order.

As described above, in a container escape procedure, a malicious process in a container usually needs to use system calls in a host machine in a specified order, and a process in the container can use a system call in the host machine only when the container has some system permissions. Therefore, in this embodiment of this application, the escape detection component may determine the container escape possibility of the first container based on the system permission of the first container and the degree of similarity between the order indicated by the target order information and the preset system call order. It should be noted that, in the LINUX system, the system permission may also be referred to as a capability.

Optionally, the target container monitoring component may obtain a startup parameter of the first container through a docker socket interface. The startup parameter is a parameter included in a docker run command that is used when the first host machine creates the first container, and the startup parameter may include at least one piece of permission information. Each piece of permission information is used to indicate one system permission of the first container, and each piece of permission information further indicates one system capability enabled by the first container. The target container monitoring component may send the startup parameter of the first container to the escape detection component such that the escape detection component obtains the system permission (a system capability) of the first container, and determines the container escape possibility of the first container based on the system permission of the first container and the degree of similarity between the order indicated by the target order information and the preset system call order.

Optionally, a plurality of permission extraction plug-ins may be disposed in the escape detection component. Each permission extraction plug-in may correspond to one piece of target permission information, each permission extraction plug-in is used to extract, from the at least one piece of permission information included in the startup parameter of the first container, target permission information corresponding to the permission extraction plug-in, and a system permission indicated by each piece of target permission information is a system permission of an escaped container.

After extracting at least one piece of target permission information, the escape detection component may determine the container escape possibility of the first container based on the at least one piece of target permission information and the degree of similarity between the order indicated by the target order information and the preset system call order.

Optionally, the escape detection component may obtain a target decision tree, the target decision tree may include at least one branch, and each branch includes a plurality of ordered nodes. Each of the plurality of nodes corresponds to one possibility identifier, and the possibility identifier is used to indicate a container escape possibility. The plurality of nodes include a system permission node and a plurality of ordered system call nodes connected to the system permission node. The system permission node corresponds to one system permission, each system call node corresponds to one system call, and an order of a plurality of system calls corresponding to the plurality of system call nodes is the same as the preset system call order. In this application, the system permission node may also be referred to as a system capability node.

Figure 2D:
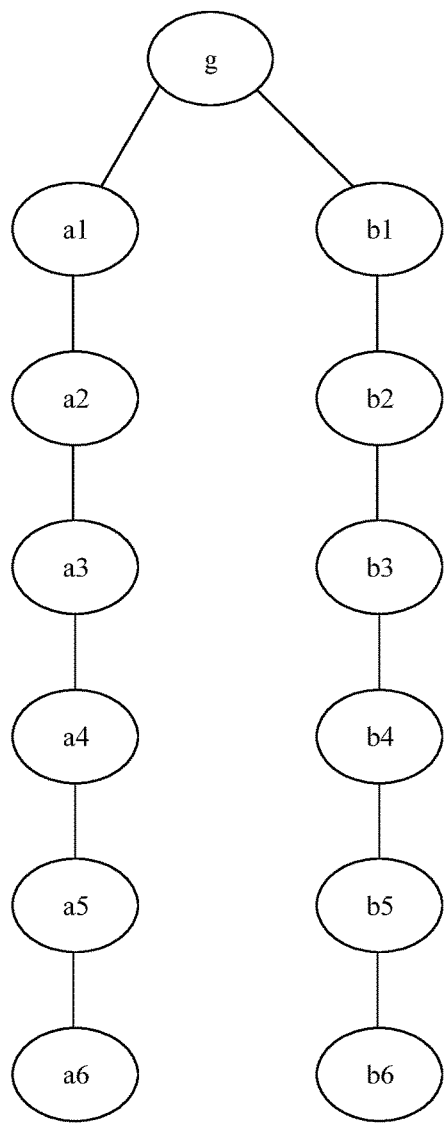
FIG. 2D is a schematic diagram of a target decision tree according to an embodiment of this application.

For example, as shown in FIG. 2D, the target decision tree may include two branches 1 and 2, the branch 1 includes a root node g, a node a1, a node a2, a node a3, a node a4, a node a5, and a node a6, and the branch 2 includes the root node g, a node b1, a node b2, a node b3, a node b4, a node b5, and a node b6. The node a1 is a system permission node and corresponds to a system permission dac_override_capability and a possibility identifier 4. The node a2 is a system call node and corresponds to a system call open_by_handle_at and a possibility identifier 5. The node a3 is a system call node and corresponds to a system call fstat and a possibility identifier 5. The node a4 is a system call node and corresponds to a system call fcntl and a possibility identifier 6. The node a5 is a system call node and corresponds to a system call getdents and a possibility identifier 6. The node a6 is a system call node and corresponds to a system call open_by_handle_at and a possibility identifier 8. The node b1 is a system permission node and corresponds to a system permission dac_read_search_capability and a possibility identifier 4. The node b2 is a system call node and corresponds to a system call open_by_handle_at and a possibility identifier 5. The node b3 is a system call node and corresponds to a system call fstat and a possibility identifier 5. The node b4 is a system call node and corresponds to a system call fcntl and a possibility identifier 6. The node b5 is a system call node and corresponds to a system call getdents and a possibility identifier 6. The node b6 is a system call node and corresponds to a system call open_by_handle_at and a possibility identifier 8. The preset system call order is open_by_handle_at, fstat, fcntl, getdents, and open_by_handle_at. A value range of a possibility identifier may be [0, 10], and a larger value of a possibility identifier indicates a higher container escape possibility. After obtaining the target decision tree, the escape detection component may determine at least one target branch from the at least one branch included in the target decision tree. The at least one target branch is in a one-to-one correspondence with the at least one piece of target permission information extracted by the escape detection component from the at least one piece of permission information included in the startup parameter of the first container, and a system permission corresponding to a system permission node included in each target branch is the same as a system permission indicated by target permission information corresponding to the target branch.

For example, when the system permission indicated by the target permission information extracted by the escape detection component from the at least one piece of permission information included in the startup parameter of the first container is dac_read_search_capability, the escape detection component may determine the branch 2 in FIG. 2D as a target branch.

After determining the at least one target branch, the escape detection component may determine the container escape possibility of the first container based on the at least one target branch.

Optionally, for each target branch, when an order that is of the first n system calls in a plurality of system calls and that is indicated by the target order information is consistent with an order of n system calls corresponding to the first n system call nodes in a plurality of system call nodes included in the target branch, the escape detection component may obtain a possibility identifier corresponding to an $n^{th}$ system call node in the target branch, where n is a positive integer greater than or equal to 1. Then, the escape detection component may determine the container escape possibility of the first container based on the possibility identifier.

For example, the order indicated by the target order information may be open_by_handle_at, fstat, fcntl, and open_by_handle_at, an order of the first three system calls is consistent with an order of three system calls (open_by_handle_at, fstat, and fcntl) corresponding to the first three system call nodes in the branch 2. In this case, the escape detection component may obtain a possibility identifier 6 corresponding to a third system call node in the branch 2, and the escape detection component may determine the container escape possibility of the first container based on the possibility identifier.

It should be noted that, in this embodiment of this application, the escape detection component may alternatively determine the container escape possibility of the first container based on other information reported by the target container monitoring component.

In a possible implementation, the target container monitoring component may report sensitive file tampering information to the escape detection component, and the escape detection component may determine the container escape possibility of the first container based on the sensitive file tampering information.

Optionally, the escape detection component may send sensitive file configuration information to the target container monitoring component, where the sensitive file configuration information may include an identifier of at least one sensitive file preset in the first host machine. The target container monitoring component may determine, based on the sensitive file configuration information, the at least one sensitive file preset in the first host machine, and monitor a write operation on the at least one sensitive file. After it is detected that a second process (the second process may be the first process, or may be a process different from the first process) in the first container performs a write operation on any one of the at least one sensitive file, the target container monitoring component may send the sensitive file tampering information to the escape detection component. In the LINUX system, the target container monitoring component may monitor, based on an observer watcher in an inotify module, a write operation on the at least one sensitive file preset in the first host machine.

As described above, when performing a container escape attack, a malicious process in a container tampers with a sensitive file in a host machine. Therefore, after the escape detection component receives the sensitive file tampering information sent by the target container monitoring component, the escape detection component may determine that the first container escapes.

In an embodiment, the sensitive file configuration information may further include an identifier of at least one sensitive file preset in the first container, and the target container monitoring component may determine the at least one sensitive file preset in the first container based on the sensitive file configuration information, and monitor a write operation on the at least one sensitive file in the first container. After it is detected that the second process in the first container performs a write operation on any one of the at least one sensitive file in the first container, the target container monitoring component may also send the sensitive file tampering information to the escape detection component. In this case, after receiving the sensitive file tampering information, the escape detection component may determine that a malicious process probably exists in the first container. Therefore, the escape detection component may determine that the first container may probably escape.

In another possible implementation, the target container monitoring component may send illegal process running information to the escape detection component, and the escape detection component may determine the container escape possibility of the first container based on the illegal process running information.

Optionally, the target container monitoring component may send a correspondence between a container image in the first host machine and a process to the escape detection component, and the escape detection component may send the correspondence to a client such that the client displays the correspondence to a user. The user may edit the correspondence. For example, the user may add some processes to the correspondence, or delete some processes from the correspondence. The client may send the correspondence edited by the user to the escape detection component. After receiving the correspondence, the escape detection component may generate a process whitelist based on processes included in the correspondence. The process whitelist may include process identifiers of a plurality of legal processes. The escape detection component may send the process whitelist to the target container monitoring component.

The target container monitoring component may monitor a process running in the first container. After the target container monitoring component detects that a process identifier of a third process (the third process may be the first process, or may be a process different from the first process) running in the first container does not belong to process identifiers included in the process whitelist, the target container monitoring component may send the illegal process running information to the escape detection component. After receiving the illegal process running information, the escape detection component may determine that an illegal process exists in the first container. Because the illegal process is likely to be a malicious process, after receiving the illegal process running information, the escape detection component may determine that the first container probably escapes.

It should be noted that in the LINUX system, the target container monitoring component may monitor, using a cAdvisor module, a process running in the first container.

Step 204. After determining the container escape possibility of the first container, the escape detection component generates a container escape event report, and sends the container escape event report to a service component.

The container escape event report may include the container escape possibility of the first container on the first host machine.

After receiving the container escape event report, the service component may store the received container escape event report in a storage component.

The client may send a query request to the service component under trigger of the user, to query the container escape event report of the first container. After receiving the query request sent by the client, the service component may obtain the container escape event report of the first container from the storage component, and sends the container escape event report to the client.

In view of the above, according to the container escape detection method provided in this embodiment of this application, the escape detection component determines the container escape possibility of the first container based on the degree of similarity between the order in which the first process in the first container uses the plurality of system calls in the first host machine and the preset system call order, where the preset system call order is an order in which a malicious process in a container uses a plurality of system calls in a host machine when the container escapes. In this way, the escape detection component can detect a container escape event that occurs after a container runs, thereby strengthening prevention of a container escape.

The following apparatus embodiments of this application may be used to execute the method embodiments of this application. For details not disclosed in the apparatus embodiments of this application, refer to the method embodiments of this application.

Figure 3:
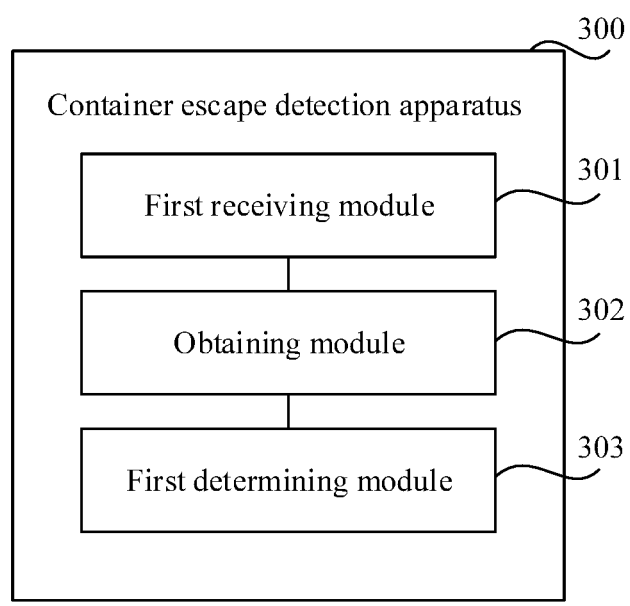
FIG. 3 is a block diagram of a container escape detection apparatus according to an embodiment of this application.

FIG. 3 is a block diagram of a container escape detection apparatus 300 according to an embodiment of this application. The container escape detection apparatus 300 may be applied to the escape detection component shown in FIG. 1B or FIG. 1C. Referring to FIG. 3, the container escape detection apparatus 300 may include a first receiving module 301, an obtaining module 302, and a first determining module 303.

The first receiving module 301 is configured to receive a plurality of pieces of system call information sent by a target container monitoring component, where each piece of system call information is sent by the target container monitoring component after the target container monitoring component detects that a first process in a first container uses a system call in a first host machine, the system call information carries an identifier of the system call used by the first process, the target container monitoring component is any one of at least one container monitoring component, the first host machine is a host machine monitored by the target container monitoring component, and the first container is a container deployed on the first host machine.

The obtaining module 302 is configured to obtain target order information based on the plurality of pieces of system call information, where the target order information is used to indicate an order in which the first process uses a plurality of system calls in the first host machine.

The first determining module 303 is configured to determine a container escape possibility of the first container based on a degree of similarity between the order indicated by the target order information and a preset system call order, where the preset system call order is an order in which a malicious process in a container uses a plurality of system calls in a host machine when the container escapes.

In an embodiment of this application, the first determining module 303 includes an obtaining submodule configured to obtain a target state machine, where the target state machine includes an initial state, a final state, and a state switching condition that needs to be satisfied for switching from the initial state to the final state, and the state switching condition is a condition that an order indicated by input order information is the same as the preset system call order, an input submodule configured to input the target order information into the target state machine when the target state machine is in the initial state, and a first determining submodule configured to, when the target state machine switches from the initial state to the final state, determine that the first container escapes.

In an embodiment of this application, the first determining module 303 includes a receiving submodule configured to receive a startup parameter that is of the first container and that is sent by the target container monitoring component, where the startup parameter includes at least one piece of permission information, and each piece of permission information is used to indicate one system permission of the first container, and a second determining submodule configured to determine the container escape possibility of the first container based on the startup parameter and the degree of similarity between the order indicated by the target order information and the preset system call order.

In an embodiment of this application, the second determining submodule is configured to obtain at least one piece of target permission information from the at least one piece of permission information included in the startup parameter, where a system permission indicated by each piece of target permission information is a system permission of an escaped container, and determine the container escape possibility of the first container based on the at least one piece of target permission information and the degree of similarity between the order indicated by the target order information and the preset system call order.

In an embodiment of this application, the second determining submodule is configured to obtain a target decision tree, where the target decision tree includes at least one branch, each branch includes a plurality of ordered nodes, each of the plurality of nodes corresponds to one possibility identifier, and the possibility identifier is used to indicate a container escape possibility, and the plurality of nodes include a system permission node and a plurality of ordered system call nodes connected to the system permission node, the system permission node corresponds to one system permission, each system call node corresponds to one system call, and an order of a plurality of system calls corresponding to the plurality of system call nodes is the same as the preset system call order, determine at least one target branch from the at least one branch, where the at least one target branch is in a one-to-one correspondence with the at least one piece of target permission information, and a system permission corresponding to a system permission node included in each target branch is the same as a system permission indicated by target permission information corresponding to the target branch, for each target branch, when an order that is of the first n system calls in a plurality of system calls and that is indicated by the target order information is consistent with an order of n system calls corresponding to the first n system call nodes in a plurality of system call nodes included in the target branch, obtain a possibility identifier corresponding to an $n^{th}$ system call node in the target branch, where n is a positive integer greater than or equal to 1, and determine the container escape possibility of the first container based on the possibility identifier.

Figure 4:
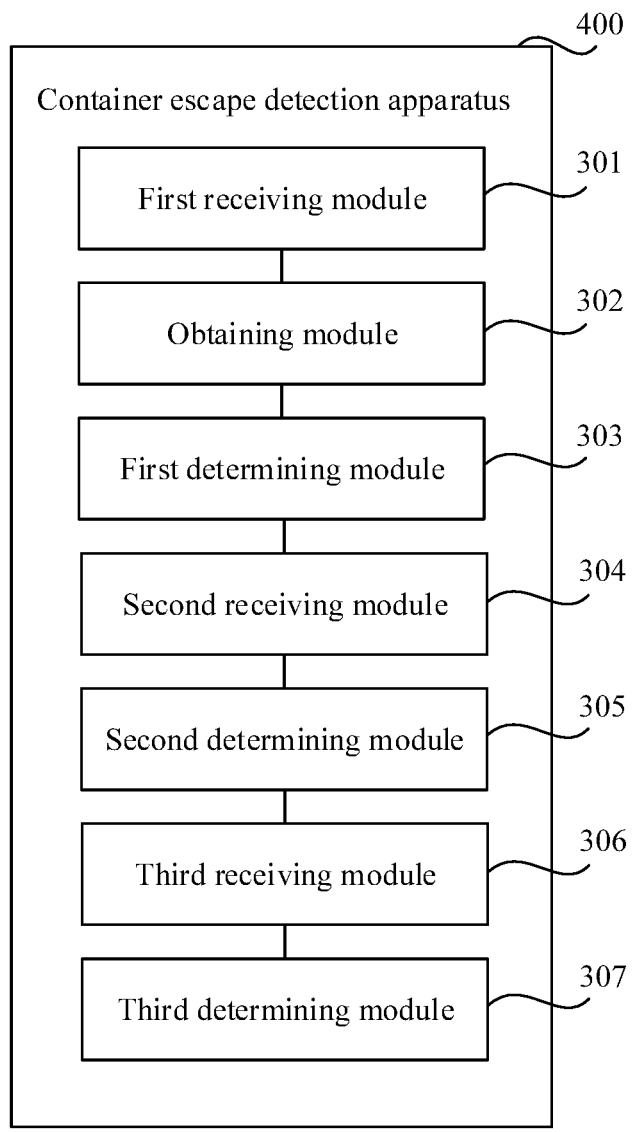
FIG. 4 is a block diagram of a container escape detection apparatus according to an embodiment of this application.

An embodiment of this application further provides another container escape detection apparatus 400. As shown in FIG. 4, in addition to the modules included in the container escape detection apparatus 300, the container escape detection apparatus 400 may include a second receiving module 304, a second determining module 305, a third receiving module 306, and a third determining module 307.

The second receiving module 304 is configured to receive sensitive file tampering information sent by the target container monitoring component, where the sensitive file tampering information is sent by the target container monitoring component after the target container monitoring component detects that a second process in the first container performs a write operation on any one of at least one sensitive file preset in the first host machine.

The second determining module 305 is configured to determine, based on the sensitive file tampering information, that the first container escapes.

The third receiving module 306 is configured to receive illegal process running information sent by the target container monitoring component, where the illegal process running information is sent by the target container monitoring component after the target container monitoring component detects that a process identifier of a third process running in the first container does not belong to process identifiers included in a process whitelist, and the process whitelist includes process identifiers of a plurality of legal processes.

The third determining module 307 is configured to determine, based on the illegal process running information, that the first container probably escapes.

In view of the above, according to the container escape detection apparatus provided in this embodiment of this application, the container escape possibility of the first container is determined based on the degree of similarity between the order in which the first process in the first container uses the plurality of system calls in the first host machine and the preset system call order, where the preset system call order is an order in which a malicious process in a container uses a plurality of system calls in a host machine when the container escapes. In this way, a container escape event that occurs after a container runs can be detected, thereby strengthening prevention of a container escape.

Figure 5:
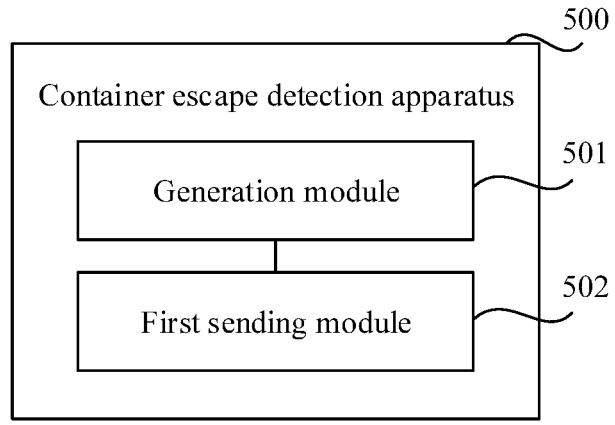
FIG. 5 is a block diagram of a container escape detection apparatus according to an embodiment of this application.

FIG. 5 is a block diagram of a container escape detection apparatus 500 according to an embodiment of this application. The container escape detection apparatus 500 may be applied to the container monitoring component shown in FIG. 1B or FIG. 1C. Referring to FIG. 5, the container escape detection apparatus 500 may include a generation module 501 and a first sending module 502.

The generation module 501 is configured to generate a plurality of pieces of system call information after it is detected that a first process in a first container uses a system call in a first host machine, where each piece of system call information carries an identifier of a system call used by the first process, the first host machine is a host machine monitored by the target container monitoring component, and the first container is a container deployed on the first host machine.

The first sending module 502 is configured to send the plurality of pieces of system call information to the escape detection component, where the plurality of pieces of system call information are used by the escape detection component to obtain target order information based on the plurality of pieces of system call information, and determine a container escape possibility of the first container based on a degree of similarity between an order indicated by the target order information and a preset system call order, where the target order information is used to indicate an order in which the first process uses a plurality of system calls in the first host machine, and the preset system call order is an order in which a malicious process in a container uses a plurality of system calls in a host machine when the container escapes.

Figure 6:
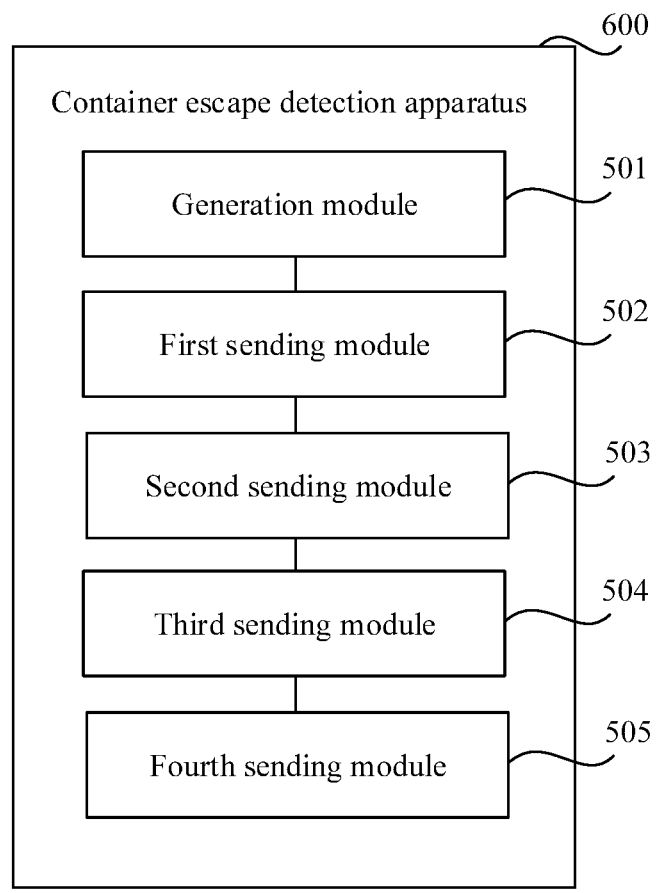
FIG. 6 is a block diagram of a container escape detection apparatus according to an embodiment of this application.

An embodiment of this application further provides another container escape detection apparatus 600. As shown in FIG. 6, in addition to the modules included in the container escape detection apparatus 500, the container escape detection apparatus 600 may include a second sending module 503, a third sending module 504, and a fourth sending module 505.

The second sending module 503 is configured to send a startup parameter of the first container to the escape detection component, where the startup parameter includes at least one piece of permission information, each piece of permission information is used to indicate one system permission of the first container, and the startup parameter is used by the escape detection component to determine the container escape possibility of the first container based on the startup parameter and the degree of similarity between the order indicated by the target order information and the preset system call order.

The third sending module 504 is configured to send sensitive file tampering information to the escape detection component after it is detected that a second process in the first container performs a write operation on any one of at least one sensitive file preset in the first host machine, where the sensitive file tampering information is used by the escape detection component to determine, based on the sensitive file tampering information, that the first container escapes.

The fourth sending module 505 is configured to send illegal process running information to the escape detection component after it is detected that a process identifier of a third process running in the first container does not belong to process identifiers included in a process whitelist, where the illegal process running information is used by the escape detection component to determine, based on the illegal process running information, that the first container probably escapes, and the process whitelist includes process identifiers of a plurality of legal processes.

In view of the above, according to the container escape detection apparatus provided in this embodiment of this application, the system call information is sent to the escape detection component after the first process in the first container uses the system call in the first host machine such that the escape detection component determines the container escape possibility of the first container based on the degree of similarity between the order in which the first process in the first container uses the plurality of system calls in the first host machine and the preset system call order, where the preset system call order is an order in which a malicious process in a container uses a plurality of system calls in a host machine when the container escapes. In this way, a container escape event that occurs after a container runs can be detected, thereby strengthening prevention of a container escape.

An embodiment of this application provides a container escape detection apparatus 700. The container escape detection apparatus 700 may be a server or another computing device on which a container may be deployed. The container escape detection apparatus 700 may be configured to perform the container escape detection method provided in the foregoing method embodiment.

Figure 7:
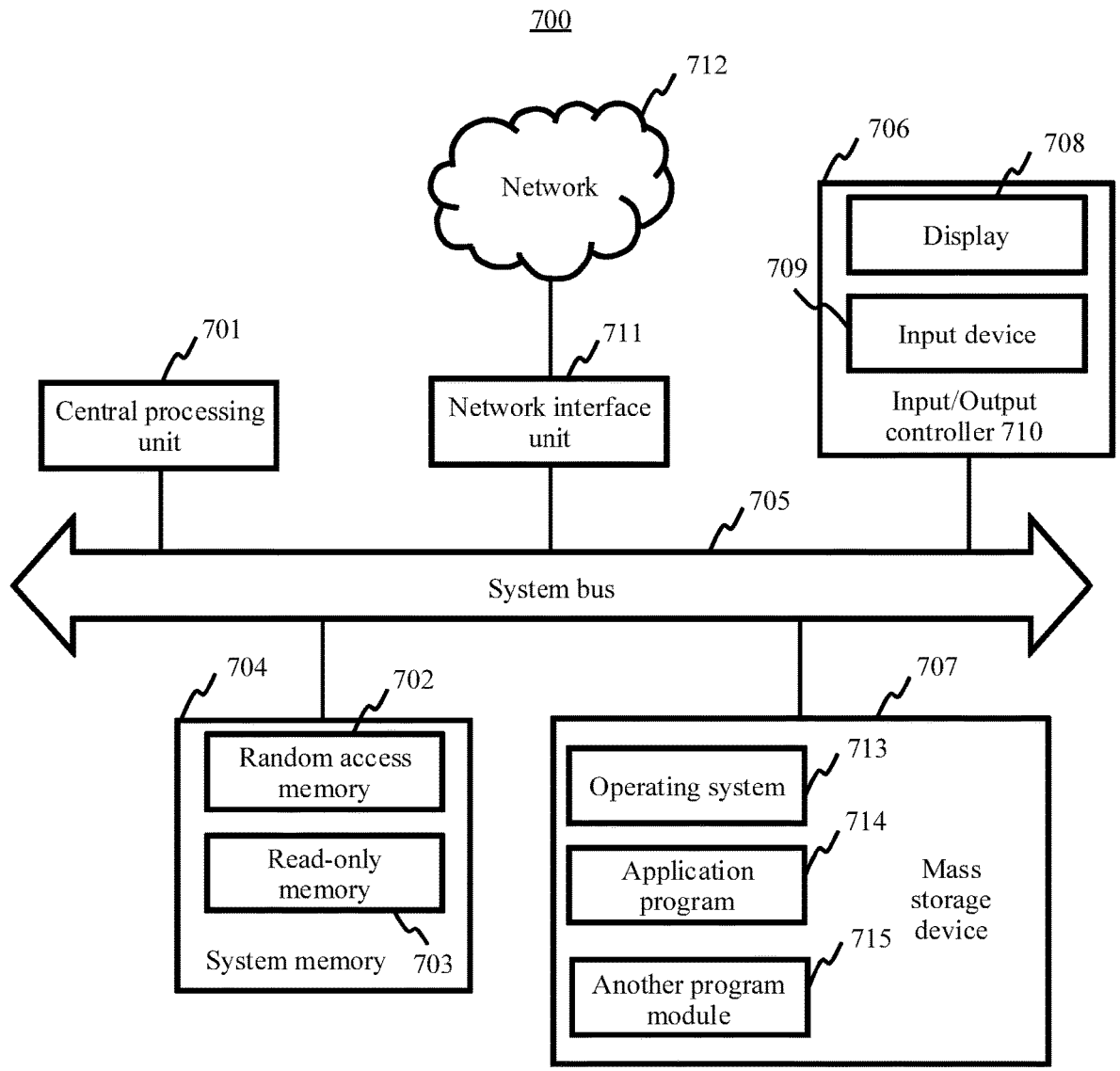
FIG. 7 is a block diagram of a container escape detection apparatus according to an embodiment of this application.

Referring to FIG. 7, the container escape detection apparatus 700 includes a processor, for example, a central processing unit (CPU) 701. The container escape detection apparatus 700 includes a memory, for example, a system memory 704 of a random-access memory (RAM) 702 and a read-only memory (ROM) 703. The container escape detection apparatus 700 includes a system bus 705 connected to the system memory 704 and the CPU 701. The container escape detection apparatus 700 further includes a basic input/output (I/O) system 706 that helps transmit information between components in a computer, and a mass storage device 707 that is configured to store an operating system 713, an application program 714, and another program module 715.

The basic I/O system 706 includes a display 708 configured to display information and an input device 709, such as a mouse or a keyboard, used by a user to enter information. The display 708 and the input device 709 are both connected to the CPU 701 using an I/O controller 710 that is connected to the system bus 705. The basic I/O system 706 may further include the I/O controller 710 configured to receive and process input from a plurality of other devices such as a keyboard, a mouse, or an electronic stylus. Similarly, the I/O controller 710 further provides output to a screen, a printer, or an output device of another type.

The mass storage device 707 is connected to the CPU 701 using a mass storage controller (not shown) connected to the system bus 705. The mass storage device 707 and a computer readable medium associated with the mass storage device 707 provide non-volatile storage for the container escape detection apparatus 700. In other words, the large-capacity storage device 707 may include a computer readable medium (not shown), such as a hard disk or a compact disc-ROM (CD-ROM) driver.

Generally, the computer readable medium may include a computer storage medium and a communications medium. The computer storage medium includes volatile, nonvolatile, movable, and unmovable media that are configured to store information such as a computer-readable instruction, a data structure, a program module, or other data and that are implemented in any method or technology. The computer storage medium includes a RAM, a ROM, an erasable programmable ROM (EPROM), an electronically EPROM (EEPROM), a flash memory or another solid-state storage technology, a CD-ROM, a digital versatile disc (DVD) or another optical storage, a cassette, a magnetic tape, a magnetic disk storage or another magnetic storage device. Certainly, a person skilled in the art may learn that the computer storage medium is not limited to the foregoing several types. The foregoing system memory 704 and the mass storage device 707 may be collectively referred to as a memory.

According to the embodiments of this application, the container escape detection apparatus 700 may be further connected to a remote computer on a network through a network such as the internet for running. That is, the container escape detection apparatus 700 may be connected to a network 712 using a network interface unit 711 that is connected on the system bus 705, or may be connected to a network of another type or a remote computer system (not shown) using the network interface unit 711.

The memory further includes one or more programs. The one or more programs are stored in the memory. The CPU 701 executes the one or more programs to implement the container escape detection method provided in the foregoing embodiment.

Figure 8:
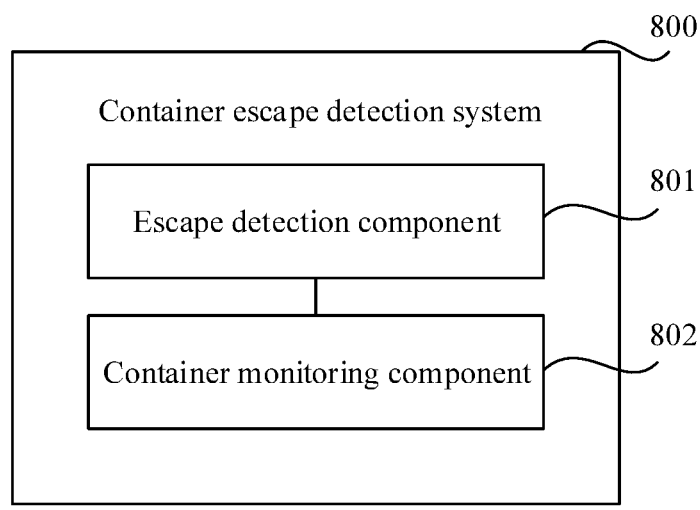
FIG. 8 is a block diagram of a container escape detection system according to an embodiment of this application.

FIG. 8 is a block diagram of a container escape detection system 800 according to an embodiment of this application. The container escape detection system 800 may include an escape detection component 801 and at least one container monitoring component 802 (FIG. 8 shows only one container monitoring component 802).

The escape detection component 801 is configured to perform the container escape detection method performed by the escape detection component in the foregoing method embodiment.

The container monitoring component 802 is configured to perform the container escape detection method performed by the target container monitoring component in the foregoing method embodiment.

An embodiment of this application further provides a non-transitory computer readable storage medium including an instruction, for example, a memory including an instruction, and the foregoing instruction may be executed by a processor to implement the container escape detection method shown in the method embodiment of this application. For example, the non-transitory computer readable storage medium may be a ROM, a RAM, a CD-ROM, a magnetic tape, a floppy disk, an optical data storage device, or the like.

An embodiment of this application further provides a computer program product including an instruction. When the computer program product is run on a computer, the computer is enabled to perform the container escape detection method shown in the method embodiment of this application.

A person of ordinary skill in the art may understand that all or some of the steps of the embodiments may be implemented by hardware or a program instructing related hardware. The program may be stored in a computer readable storage medium. The storage medium may include a ROM, a magnetic disk, or an optical disc.

The foregoing descriptions are merely optional embodiments of this application, but are not intended to limit this application. Any modification, equivalent replacement, or improvement made without departing from the spirit and principle of this application should fall within the protection scope of this application.

What is claimed is:

1. A method, comprising:
receiving information about a plurality of system calls from a monitored container of at least one container running on a host machine of a computing system, wherein the information comprises first system call information, second system call information, and third system call information, wherein the first system call information corresponds to a first system call used by a first process and comprises a first time associated with the first system call, wherein the second system call information corresponds to a second system call used by the first process and comprises a second time associated with the second system call, wherein the third system call information corresponds to a third system call used by the first process and comprises a third time associated with the third system call, and wherein the first time, the second time, and the third time are different times;
generating, based on the information, an occurrence order of the plurality of system calls according to the first time, the second time, and the third time;
matching, based on an escape detection rule, the occurrence order of the plurality of system calls with at least one group of preset system call orders, wherein the escape detection rule comprises the at least one group of preset system call orders; and
detecting, based on a result of the matching, whether the monitored container has escaped.

2. The method of claim 1, wherein the escape detection rule further comprises at least one predefined high-risk system capability related to a container escape, and wherein the method further comprises:

receiving a startup parameter of the monitored container, wherein the startup parameter comprises a system capability enabled by the monitored container; and
detecting, according to the escape detection rule and the system capability enabled by the monitored container, whether the monitored container has escaped.

3. The method of claim 1, further comprising:
receiving sensitive file tampering information after a process in the monitored container performs a write operation on a sensitive file preset in the host machine; and
detecting, based on the sensitive file tampering information, that the monitored container has escaped.

4. The method of claim 1, further comprising sending, based on whether the monitored container has escaped, a container escape event report.

5. The method of claim 1, further comprising sending, based on whether the monitored container has escaped, an escape alarm.

6. The method of claim 1, further comprising generating, based on the occurrence order, target order information.

7. The method of claim 1, wherein the first time, the second time, and the third time comprise generation times of the plurality of system calls or trigger times of the plurality of system calls.

8. The method of claim 1, wherein the first time, the second time, and the third time comprise execution times of the plurality of system calls or receiving times of the plurality of system calls.

9. An apparatus, comprising:
one or more processors; and
a memory coupled to the one or more processors, wherein the memory stores instructions that, when executed by the one or more processors, cause the apparatus to be configured to:
receive information about a plurality of system calls from a monitored container of at least one container running on a host machine of a computing system, wherein the information comprises first system call information, second system call information, and third system call information, wherein the first system call information corresponds to a first system call used by a first process and comprises a first time associated with the first system call, wherein the second system call information corresponds to a second system call used by the first process and comprises a second time associated with the second system call, wherein the third system call information corresponds to a third system call used by the first process and comprises a third time associated with the third system call, and wherein the first time, the second time, and the third time are different times;
generate, based on the information, an occurrence order of the plurality of system calls according to the first time, the second time, and the third time;
match, based on an escape detection rule, the occurrence order of the plurality of system calls with at least one group of preset system call orders, wherein the escape detection rule comprises the at least one group of preset system call orders; and
detect, based on a result of the matching, whether the monitored container escapes.

10. The apparatus of claim 9, wherein the instructions further cause the apparatus to be configured to:
generate, based on the occurrence order, target order information; and detect, based on a degree of similarity between an order indicated by the target order information and the at least one group of preset system call orders, a container escape possibility of the monitored container.

11. The apparatus of claim 9, wherein the escape detection rule further comprises at least one predefined high-risk system capability related to a container escape, and wherein the instructions further cause the apparatus to be configured to:

receive a startup parameter of the monitored container, wherein the startup parameter comprises a system capability enabled by the monitored container; and detect, according to the escape detection rule and the system capability enabled by the monitored container, whether the monitored container has escaped.

12. The apparatus of claim 9, wherein the instructions further cause the apparatus to be configured to:

receive sensitive file tampering information after a process in the monitored container performs a write operation on a sensitive file preset in the host machine; and detect, based on the sensitive file tampering information, that the monitored container has escaped.

13. The apparatus of claim 9, wherein the instructions further cause the apparatus to be configured to send, based on whether the monitored container has escaped, a container escape event report.

14. The apparatus of claim 9, wherein the instructions further cause the apparatus to be configured to send, based on whether the monitored container has escaped, an escape alarm.

15. A computer program product comprising computer-executable instructions stored on a non-transitory computer-readable medium that, when executed by one or more processors, cause an apparatus to:

receive information about a plurality of system calls from a monitored container of at least one container running on a host machine of a computing system, wherein the information comprises first system call information, second system call information, and third system call information, wherein the first system call information corresponds to a first system call used by a first process and comprises a first time associated with the first system call, wherein the second system call information corresponds to a second system call used by the first process and comprises a second time associated with the second system call, wherein the third system call information corresponds to a third system call used by the first process and comprises a third time associated with the third system call, and wherein the first time, the second time, and the third time are different times;

generate, based on the information, an occurrence order of the plurality of system calls according to the first time, the second time, and the third time;

match, based on an escape detection rule, the occurrence order of the plurality of system calls with at least one group of preset system call orders, wherein the escape detection rule comprises the at least one group of preset call orders; and detect, based on a result of the matching, whether the monitored container escapes.

16. The computer program product of claim 15, wherein the instructions further cause the apparatus to be configured to generate, based on the occurrence order, target order information.

17. The computer program product of claim 15, wherein the escape detection rule comprises at least one predefined high-risk system capability related to a container escape, and wherein the instructions further cause the apparatus to be configured to:

receive a startup parameter of the monitored container, wherein the startup parameter comprises a system capability enabled by the monitored container; and detect, according to the escape detection rule and the system capability enabled by the monitored container, whether the monitored container has escaped.

18. The computer program product of claim 15, wherein the instructions further cause the apparatus to be configured to:

receive sensitive file tampering information after a process in the monitored container performs a write operation on a sensitive file preset in the host machine; and detect, based on the sensitive file tampering information, that the monitored container has escaped.

19. The computer program product of claim 15, wherein the instructions further cause the apparatus to be configured to send, based on whether the monitored container has escaped, a container escape event report.

20. The computer program product of claim 15, wherein the instructions further cause the apparatus to be configured to send, based on whether the monitored container has escaped, an escape alarm.

* * * * *